United States Patent [19]

Rhodes

[11] Patent Number: 4,643,053

[45] Date of Patent: Feb. 17, 1987

[54] OIL FILTER REMOVAL TOOL

[76] Inventor: Charles W. Rhodes, 204 Tanglewood, Victoria, Tex. 77901

[21] Appl. No.: 300,479

[22] Filed: Sep. 9, 1981

[51] Int. Cl.$^4$ ............................................. B25B 13/28
[52] U.S. Cl. ..................................... 81/90.3; 81/176.2; 81/176.3; 81/3.44
[58] Field of Search ........................ 81/3.4, 3.44, 90 R, 81/90 B, 91 R, 111, 90.1, 90.3, 176.1, 176.15, 176.2, 176.3

[56] References Cited

U.S. PATENT DOCUMENTS

| | | |
|---|---|---|
| 348,185 | 8/1886 | Bowman . |
| 919,599 | 4/1909 | Lafferty . |
| 1,224,801 | 5/1917 | Sprung . |
| 1,375,456 | 4/1921 | Hasty . |
| 1,516,602 | 11/1924 | Hill . |
| 1,614,328 | 1/1927 | Thompson . |
| 2,674,911 | 4/1954 | Theis ..................................... 81/3.44 |
| 2,700,315 | 1/1955 | Hermanson ........................... 81/183 |
| 2,810,313 | 10/1957 | Hermanson ......................... 81/90 B |
| 2,968,203 | 1/1961 | Crafford ................................. 81/53 |
| 3,066,559 | 12/1962 | Harvel et al. ......................... 81/53 |
| 3,240,086 | 5/1968 | Way ...................................... 81/111 |
| 3,385,141 | 5/1968 | Norman ............................... 81/90 R |
| 3,853,026 | 12/1974 | Rhodes ................................. 81/91 R |

FOREIGN PATENT DOCUMENTS

| | | | |
|---|---|---|---|
| 925128 | 3/1947 | France . | |
| 4211 | of 1889 | United Kingdom ................. | 81/3.44 |
| 22373 | of 1897 | United Kingdom . | |

OTHER PUBLICATIONS

IBM Technical Disclosure Bulletin, vol. 17, No. 4, 9/1974, "Wrench Adapter", p. 985.

Primary Examiner—Frederick R. Schmidt
Assistant Examiner—Debra S. Meislin
Attorney, Agent, or Firm—Munson H. Lane, Jr.

[57] ABSTRACT

A tool designed primarily for the removal of oil filters of the canister type. The tool is generally cup shaped and of a design to operate in a minimum of working space. The tool has finger portions defined by cut-out openings equally spaced about the central axis. Gripping surfaces in the form of spring biased roller cams mounted on the finger portions serve to secure the tool on the canister when the tool is positioned thereon and to firmly grip and lock the tool upon the canister when rotated by a suitable wrench, thereby enabling the canister to be easily removed from the engine block.

8 Claims, 4 Drawing Figures

OIL FILTER REMOVAL TOOL

BACKGROUND OF THE INVENTION

The invention relates to improved hand tools designed primarily for the removal of oil filters having a throw-away canister type of cartridge which are mounted on the engine block of automobiles and other motorized equipment by a threaded connection.

Canister type oil filters tend to become frozen in place and a major problem is in breaking the filter canister loose from the engine block, and having something to hold the filter canister with if the filter canister is still hot. Since most canisters are of standarized external configuration, they lend themselves to the use of tools for removal. The usual tool used in the past comprises a flexible band or strap which encircles and frictionally engages the cylindrical body of the canister, but some fail to grip the canister tight enough to prevent the tool from slipping about the canister. Also prior known tools for the most part have been provided with long handles which make them difficult and awkward, if not impossible, to use in the confined areas of present day automobiles.

In addition, the prior known oil filter removal tools have been found to comprise an excessive number of parts and prone to inaccurate alignment with consequent damaging forces upon the canister mounting structure.

Although there are many oil filter removal tools available for marketing today, few are actually available for sale and for very good reasons. The task of developing a device that is competitive is a complex one. The tool must be small, easily handled, have very positive gripping means, be able to operate in a very small space and cost little to manufacture.

Accordingly, the primary object of this invention is to provide maintenance personnel with a tool for removing an oil filter canister of the character described that is low cost, is of simple construction but with strong gripping power, and is easily aligned in confined working areas with the canister.

SUMMARY OF THE INVENTION

In accordance with this invention, there is provided an oil filter canister removing tool in the form of a cup-shaped housing which is designed for use under conditions of minimum clearance. The cup-shaped body has cut-out openings at one end defining arms or finger portions which encircle the canister upon positioning the tool thereon and which mount a plurality of roller cams functioning as positive canister gripping surfaces. After applying the tool to the canister to be removed, the tool may be operated by rotation in a proper direction by a suitable wrench causing the cams to positively grip the canister and lock the tool thereon, enabling the canister to be easily removed from the engine block.

BRIEF DESCRIPTION OF THE DRAWINGS

The invention will be more readily understood by reference to the accompanying drawings and the following detailed description which are intended as illustrative only and not limiting the invention to the particular details set forth.

In the drawings.

DETAILED DESCRIPTION OF THE INVENTION

Figure 1:
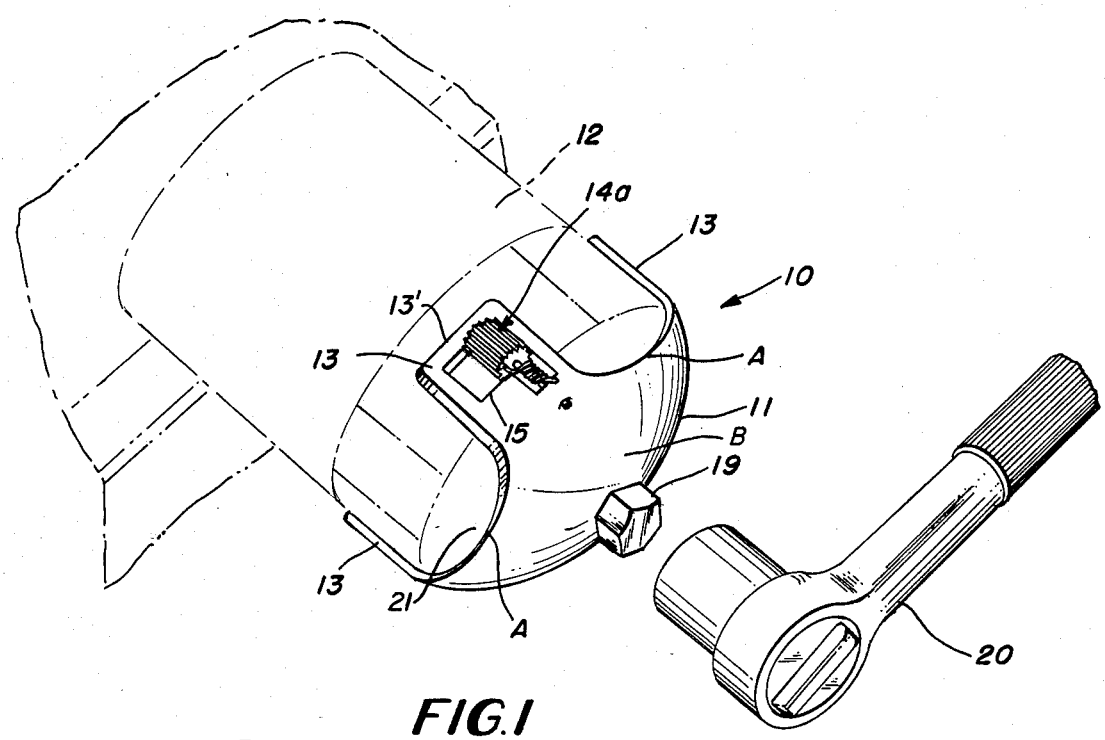
FIG. 1 is a perspective view of a conventional oil filter canister in broken lines with the tool of the present invention mounted thereon and a portion of a socket wrench being shown prior to operative engagement with the tool.

The oil filter tool denoted generally by reference numeral 10 comprises a shallow cup-shaped body in the form of a dome-shaped housing 11 having a bottom portion B and an open end adapted to be placed over a conventional oil filter canister 12, represented in broken lines, one end of which has internal threads (not shown) for engagement with mating threads formed on the associated engine block represented fragmentarily in broken lines in FIG. 1.

The open end of the housing 11 is defined by axially extending finger portions 13 projecting from said bottom portion which are of minimal length and which are formed by cut-out openings A. The cut-out design reduces the amount of material necessary for making the body and results in other advantages that will hereinafter be made evident. The finger portions serve to mount cam means 14a, 14b, and 14c. The finger portions and cam means are shown as three in number and are substantially equally spaced about the longitudinal axis of the housing 11 which extends through the center C (FIG. 2) of said bottom portion B.

To facilitate description, the details of only one of the finger portions and associated cam means will be described hereinafter. It will be understood that each finger portion and cam means will be constructed in the same manner except where specifically noted.

Figure 4:
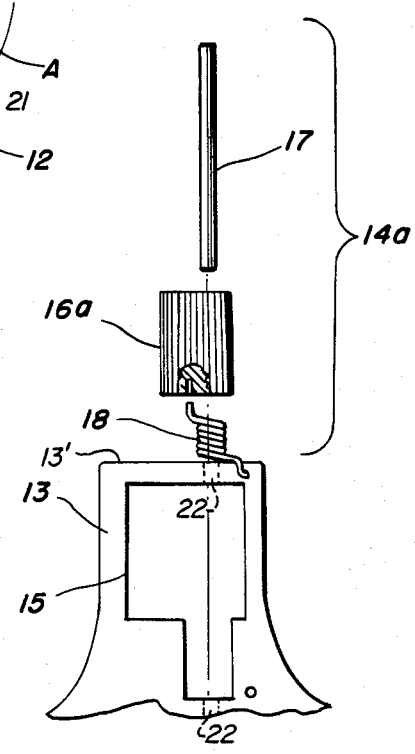
FIG. 4 is an enlarged view of one finger portion of the tool showing in detail an exploded view of the individual elements making up a roller cam gripping surface mounted in each finger portion of the improved filter removing tool.

Each finger portion 13 has a free end 13' and a cam receiving opening 15 formed therein and spaced from said free end to mount a cam means and as particularly illustrated in FIG. 4, the cam means 14a is in the form of a gripper wheel or roller 16a having a roughened surface. The roller is eccentrically mounted by means of a pin 17 which is received in aligned holes 22 completely punched longitudinally through the finger portion 13 to allow for easy removal.

A spring 18 carried on the pin, having one end bearing against a surface of the finger portion and another end attached to the cam roller urges the respective cam roller into filter canister engaging position. One edge of the cam roller may be chamfered to provide for ease of assembly of the tool housing onto the filter canister.

Figure 3:
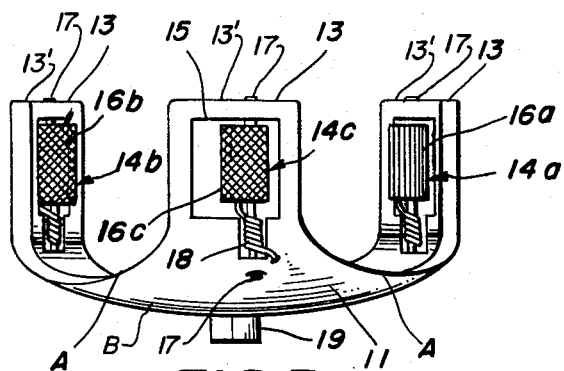
FIG. 3 is a view in side elevation of the improved filter removing tool.

As illustrated in FIG. 3, the roller cams may have different forms of roughened surfaces to frictionally engage the canister. A preferred embodiment as shown utilizes one splined or slotted roller 16a with the other rollers 16b, 16c being knurled.

It is to be noted that the tool in its preferred form has three gripping surfaces which are spring loaded so there is a constant pressure by the gripping surfaces. When pressure is applied to turn the filter canister and then released, the small springs hold the removal tool in place. The device is made in such a way that the tool itself has a ratchet action for mounting on the canister, removing or repositioning on the canister.

The other end of the tool housing 11 has a polygonal shaped lug or head 19 formed along the longitudinal axis of the housing. The lug is obviously adapted for engagement by any suitable tool such as a socket wrench illustrated at 20 to actuate the tool housing and associated cam means. The ratchet action afforded by a conventional socket wrench enables the operating tool arm to be adjusted in the event adjacent structure prevents complete rotation of the operating arm.

To remove an oil filter canister, the open end of the housing 11 is easily placed over the outer end of the filter canister 12 to be removed. It is evident that the configuration of the housing lends itself to manipulation in spaces wherein the canister has a minimum of clearance and the cut-away design at the open end of the housing additionally provides a means for visually aligning the housing with the filter canister to facilitate proper alignment. The spring urged cam means 14a, 14b, 14c initially hold the tool housing securely on the canister with a friction fit. The wrench 20 is placed on the lug 19, and the lug and housing 11 are rotated as a unit in the proper direction for removal of the oil canister. As the housing is turned, the cam rollers are caused to rotate and to grip the canister more tightly. The gripping action may cause slight indentations to be formed in the side of the filter canister but without tearing holes in the side, thereby locking the tool in position on the canister. Whereas some tools tend to crush the filter as pressure is applied in an attempt to turn the filter canister, the design of this invention will not harm the canister as essentially all pressure is directed around the canister in a clockwise or counterclockwise direction. By turning the lug and tool housing in the proper direction, the canister will be easily removed from the engine block. The operation of locking the tool housing onto the canister is done so that when the wrench 20 is removed, the tool housing 11 remains locked on the canister, and the canister can be unscrewed from the engine block by holding onto the tool housing rather than the canister which is often hot and covered with oil, grit, etc. When it is desired to remove the tool housing from the canister, a slight turn in the opposite direction will loosen it.

Figure 2:
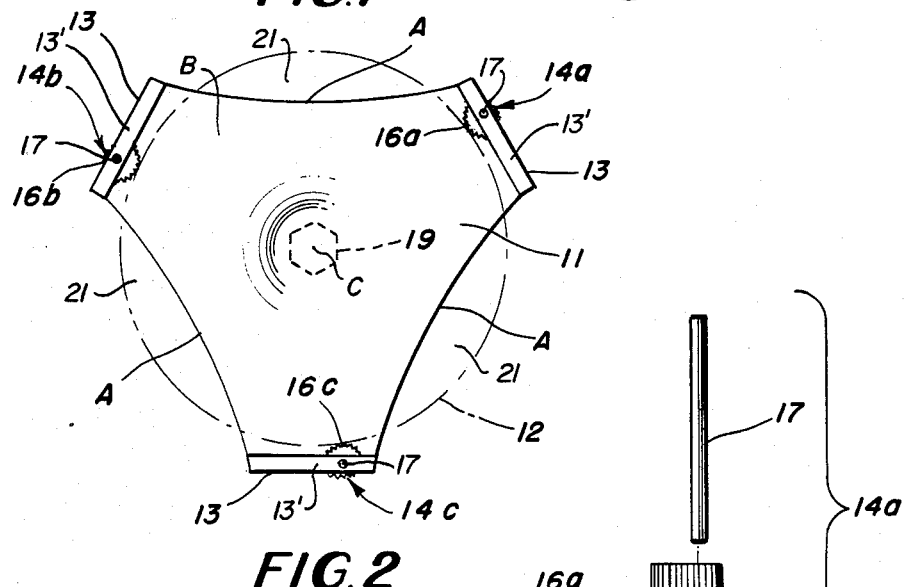
FIG. 2 is a top plan view of the improved filter removing tool of FIG. 1.

A feature of the invention, clearly shown in FIGS. 1, 2 and 3, is that the cut-out openings A extend from the open end of the cup-shaped housing 11 into the bottom portion B and form inwardly extending recesses 21 (see FIG. 2) in the bottom portion B between the finger portions 13. The radial inward extent of the recesses 21 between the finger portions 13 is sufficient so that the bottom portion B between the finger portions 13 is substantially less than radially coextensive with the end of an oil filter canister (see dotted lines 12 in FIG. 2) over which the hand tool of the invention is adapted to fit. The recesses 21 provide clear vision of the end of an oil filter canister, to which the hand tool 10 is applied, in areas between the finger portions 13. The only portions of the bottom portion B which extend beyond the circumference of an oil filter canister over which the tool 10 is applied are the portions from which the fingers 13 project.

The invention has been described in detail for the purpose of illustration but it will be obvious that various modifications and variations may be resorted to without departing from the spirit of the invention in its broadest aspects.

What is claimed is:

1. A hand tool for removal of oil filter canisters and the like comprising:
   a cup-shaped housing having an open end adapted to fit over one end of a filter canister to be removed,
   said housing including a longitudinal axis, a bottom portion centered on said axis, and axially extending finger portions projecting from said bottom portion and defining said open end, said finger portions being circumferentially spaced thereby defining axially extending openings to aid in visually aligning the tool housing upon a filter canister, said axially extending openings extending into said bottom portion and forming inwardly extending recesses in said bottom portion between said finger portions, the radial inward extent of said recesses being sufficient for the bottom portion between said finger portions to be substantially less than coextensive with the end of an oil filter canister over which said hand tool is adapted to fit,
   each of said finger portions having a free end and a cam receiving opening formed therein and spaced from said free end, a hole extending longitudinally through each finger portion from said free end and intersecting said cam receiving opening, a pin mounted in each said hole and extending through said cam receiving opening and cam means for each of said finger portions mounted on said pin to swing within said cam receiving opening for engagement with a filter canister near said one end, and
   means for rotating the housing in one direction to bring the cam means of each finger portion into operative position to engage a filter canister and rotate same.

2. A hand tool as set forth in claim 1 wherein said pin is exposed at each end for ease of removal.

3. A hand tool as set forth in claim 1 wherein the cam means comprises a roller eccentrically mounted on said pin.

4. A hand tool as set forth in claim 1 wherein the cam means of at least two finger portions are provided with knurling.

5. A hand tool as set forth in claim 1 wherein the finger portions and associated cam means are disposed substantially equally spaced about the longitudinal axis of the tool housing.

6. A hand tool as set forth in claim 1 wherein the cam means are provided with spring biasing means to urge same into a canister engaging position.

7. A hand tool as set forth in claim 1 wherein the means for rotating the tool housing comprises a lug provided centrally on the bottom portion of the housing adapted for engagement by a suitable wrench.

8. A hand tool as set forth in claim 1 wherein the cup-shaped housing has a dome-like configuration.

* * * * *